(12) United States Patent
Li et al.

(10) Patent No.: US 12,519,588 B2
(45) Date of Patent: Jan. 6, 2026

(54) SYNCHRONIZATION METHOD AND APPARATUS

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Wei Li, Beijing (CN); Li Han, Beijing (CN); Feng Qu, Beijing (CN); Biqi Li, Beijing (CN); Li Ma, Beijing (CN)

(73) Assignees: BEIJING BOE TECHNOLOGY DEVELOPMENT CO., LTD., Beijing (CN); BOE TECHNOLOGY GROUP CO., LTD, Beijing (CN)

( * ) Notice: Subject to any disclaimer, the term of this patent is extended or adjusted under 35 U.S.C. 154(b) by 308 days.

(21) Appl. No.: 18/546,435

(22) PCT Filed: Nov. 16, 2022

(86) PCT No.: PCT/CN2022/132379
§ 371 (c)(1),
(2) Date: Aug. 15, 2023

(87) PCT Pub. No.: WO2024/103318
PCT Pub. Date: May 23, 2024

(65) Prior Publication Data
US 2025/0007661 A1    Jan. 2, 2025

(51) Int. Cl.
*H04L 5/00* (2006.01)
*H04W 56/00* (2009.01)

(52) U.S. Cl.
CPC ......... *H04L 5/0048* (2013.01); *H04W 56/001* (2013.01)

(58) Field of Classification Search
CPC .............. H04L 5/0048; H04W 56/001; H04W 56/0015; H04W 56/00; H04J 3/06
See application file for complete search history.

(56) References Cited

U.S. PATENT DOCUMENTS

| 2019/0116568 A1 | 4/2019 | Fertonani et al. |
| 2021/0013959 A1 | 1/2021 | Yuan et al. |

(Continued)

FOREIGN PATENT DOCUMENTS

| CN | 104735773 A | 6/2015 |
| CN | 106470462 A | 3/2017 |

(Continued)

OTHER PUBLICATIONS

Gu Yunfeng, "Study on on Timing Synchronization Technology Based on 5G Terminals" (w/ English translation), Electronic Technology, vol. 51, Issue 7, Jul. 2022, 10 pages.

(Continued)

*Primary Examiner* — Kyaw Z Soe
(74) *Attorney, Agent, or Firm* — Dority & Manning, P.A.

(57) ABSTRACT

A synchronization method includes: acquiring radio frame data from a sending node; performing a search of a synchronization signal in the radio frame data in the radio frame to determine location information of the synchronization signal in the radio frame data; determining a time calibration parameter of the receiving node according to the location information of the synchronization signal and a frame structure of the radio frame; and calibrating a local clock of the receiving node according to the time calibration parameter and the local clock of the receiving node, so that the receiving node is synchronized with the sending node.

20 Claims, 11 Drawing Sheets

(56) References Cited

U.S. PATENT DOCUMENTS

2022/0377683 A1\* 11/2022 Myung ............. H04W 74/0816
2024/0284365 A1\* 8/2024 Zhao ................... H04W 56/001

FOREIGN PATENT DOCUMENTS

| | | |
|---|---|---|
| CN | 107231182 A | 10/2017 |
| CN | 107404754 A | 11/2017 |
| CN | 107577140 A | 1/2018 |
| CN | 109644290 A | 4/2019 |
| CN | 110113812 A | 8/2019 |
| CN | 111884745 A | 11/2020 |
| CN | 111885696 A | 11/2020 |
| CN | 112533280 A | 3/2021 |
| CN | 113099527 A | 7/2021 |
| CN | 113225803 A | 8/2021 |
| WO | WO2020242823 A1 | 12/2020 |

OTHER PUBLICATIONS

Liu Kuan, "Research on time-frequency synchronization technology of 5G NR mm Wave system" (w/ English abstract), Master Thesis, University of Electronic Science and Technology of China, Apr. 8, 2022, 88 pages.
"Considerations for Synchronization Signals Design in NR Beamformed Initial Access", MediaTek Inc., 3GPP TSG RAN WG1 Meeting #85, Gothenburg, Sweden, Aug. 22-26, 2016, 6 pages.
Chinese First Office Action (with English translation) for corresponding Application No. CN202280004290.X, dated Jul. 8, 2025, 16 pages.

\* cited by examiner

SYNCHRONIZATION METHOD AND APPARATUS

CROSS-REFERENCE TO RELATED APPLICATION

The present application is a national phase entry under 35 USC 371 of International Patent Application No. PCT/CN2022/132379, filed on Nov. 16, 2022, which is incorporated herein by reference in its entirety.

TECHNICAL FIELD

The present disclosure relates to the field of communications technologies, and in particular, to a synchronization method and an apparatus.

BACKGROUND

The synchronization process refers to the process in which the mobile terminal acquires the time and frequency of the wireless network, which is a prerequisite for the mobile terminal to access the network. The mobile terminal may acquire the time information and frequency information of the data delivered by the network through the synchronization process. In this way, the mobile device may accurately receive the data delivered by the network side according to the time information and frequency information.

Generally, the mobile device may achieve time and frequency synchronization with the network side by means of the global positioning system (GPS) synchronization. However, in the manner of GPS synchronization, the mobile device needs to calculate the phase difference between the GPS and the base station, and needs to adjust again when the GPS changes. That is, the manner of GPS synchronization is complicated.

SUMMARY

In an aspect, a synchronization method applied to a receiving node is provided. The method includes: acquiring radio frame data from a sending node, the radio frame data being carried on a radio frame, and the radio frame data including a synchronization signal; performing a search of the synchronization signal in the radio frame data on the radio frame to determine location information of the synchronization signal in the radio frame data; the location information being used to indicate a time-frequency location of the synchronization signal in the radio frame; determining a time calibration parameter of the receiving node according to the location information of the synchronization signal and a frame structure of the radio frame; and calibrating a local clock of the receiving node according to the time calibration parameter and the local clock of the receiving node, so that the receiving node is synchronized with the sending node.

In some embodiments, the "performing a search of the synchronization signal in the radio frame data on the radio frame to determine location information of the synchronization signal in the radio frame data" includes: performing a down-sampling search on the radio frame data to determine a starting location of the synchronization signal in the radio frame; and determining the location information of the synchronization signal in the radio frame according to the starting location of the synchronization signal in the radio frame.

In some embodiments, the "performing a down-sampling search on the radio frame data to determine a starting location of the synchronization signal in the radio frame" includes: performing the down-sampling search on the radio frame data according to a preset step size, and detecting whether radio frame data corresponding to each sampling point includes a signal, different sampling points having different frequency domain locations in the radio frame; and determining, if radio frame data corresponding to a sampling point includes a signal and a signal strength value of the signal is greater than a preset threshold, the starting location of the synchronization signal according to a time-frequency location of the sampling point in the radio frame.

In some embodiments, the "detecting whether radio frame data corresponding to each sampling point includes a signal" includes: determining whether a signal exists in the radio frame data corresponding to each sampling point according to envelope information of the radio frame data of each sampling point.

In some embodiments, the method further includes: switching, if radio frame data corresponding to a sampling point include no signal, frequency points; and detecting whether a signal exists in radio frame data corresponding to a switched frequency point.

In some embodiments, the "determining the starting location of the synchronization signal according to a time-frequency location of the sampling point in the radio frame" includes: determining signal strength values of a plurality of frequency points that are adjacent to the sampling point; using a frequency point with a largest signal strength value as a frequency point corresponding to the synchronization signal; and determining the starting position of the synchronization signal according to time-frequency information of the frequency point.

In some embodiments, the receiving node includes a field programmable gate array (FPGA) and a processor, the method further includes: encapsulating the radio frame data and the local clock through the FPGA, and transmitting an encapsulated radio frame data to the processor, so that the processor performs preprocessing on the encapsulated radio frame data to obtain radio frame data and a local clock when the receiving node receives the radio frame data.

In some embodiments, the radio frame includes at least one candidate time-frequency location periodically distributed, the candidate time-frequency location is used to carry the synchronization signal, and a candidate time-frequency location corresponds to a plurality of consecutive time-domain symbols in a sub-frame and a plurality of consecutive frequency domain units.

In some embodiments, the radio frame is a new radio interface (NR) radio frame or a long term evolution (LTE) radio frame.

In another aspect, a synchronization apparatus applied to a receiving node is provided. The synchronization apparatus includes an acquisition unit and a processing unit.

The acquisition unit is configured to acquire radio frame data from a sending node. The radio frame data is carried on a radio frame, and the radio frame data includes a synchronization signal.

The processing unit is configured to perform a search of the synchronization signal in the radio frame data on the radio frame to determine location information of the synchronization signal in the radio frame data. The location information of the synchronization signal is used to indicate a time-frequency location of the synchronization signal in the radio frame.

The processing unit is further configured to determine a time calibration parameter of the receiving node according to the location information of the synchronization signal and a frame structure of the radio frame.

The processing unit is further configured to calibrate a local clock of the receiving node according to the time calibration parameter and the local clock of the receiving node, so that the receiving node is synchronized with the sending node.

In some embodiments, the processing unit is configured to: perform a down-sampling search on the radio frame data to determine a starting location of the synchronization signal on the radio frame; and determine the location information of the synchronization signal on the radio frame according to the starting location of the synchronization signal on the radio frame.

In some embodiments, the processing unit is configured to: perform the down-sampling search on the radio frame data according to a preset step size, and detect whether radio frame data corresponding to each sampling point includes a signal, different sampling points having different time-frequency locations in the radio frame; and determine, if radio frame data corresponding to a sampling point includes a signal and a signal strength value of the signal is greater than a preset threshold, the starting location of the synchronization signal according to a time-frequency location of the sampling point in the radio frame.

In some embodiments, the processing unit is configured to: determine whether a signal exists in the radio frame data corresponding to each sampling point according to envelope information of the radio frame data of each sampling point.

In some embodiments, the processing unit is further configured to: switching, if radio frame data corresponding to a sampling point include no signal, frequency points, and detecting whether a signal exists in radio frame data corresponding to a switched frequency point.

In some embodiments, the processing unit is configured to: determining signal strength values of a plurality of frequency points that are adjacent to the sampling point; using a frequency point with a largest signal strength value as a frequency point corresponding to the synchronization signal; and determining the starting position of the synchronization signal according to time-frequency information of the frequency point.

In some embodiments, the receiving node includes a FPGA and a processor. The FPGA is configured to: encapsulate the radio frame data and the local clock; and transmit an encapsulated data to the processor. The processor is configured to perform preprocessing on the encapsulated radio frame data to obtain radio frame data and a local clock when the receiving node receives the radio frame data.

In some embodiments, the radio frame includes at least one candidate time-frequency location periodically distributed, the candidate time-frequency location is used to carry the synchronization signal, and a candidate time-frequency location corresponds to a plurality of consecutive time-domain symbols in a sub-frame and a plurality of consecutive frequency domain units.

In some embodiments, the radio frame is an NR radio frame or an LTE radio frame.

In yet another aspect, a synchronization apparatus is provided. The synchronization apparatus includes a processor and a communication interface. The communication interface is coupled to the processor. The processor is used to run computer programs or instructions to implement the synchronization method in any embodiment described above.

In yet another aspect, a non-transitory computer-readable storage medium is provided. The computer-readable storage medium has stored computer program instructions that, when run on a computer (e.g., a receiving node), cause the computer to execute the synchronization method as described in any one of the above embodiments.

In yet another aspect, a computer program product is provided. The computer program product includes computer program instructions, and when executed on a computer (e.g., a receiving node), the computer program instructions cause the computer to perform the synchronization method as described in any one of the above embodiments.

In yet another aspect, a computer program is provided. When executed on a computer (e.g., a receiving node), the computer program causes the computer to perform the synchronization method as described in any one of the above embodiments.

BRIEF DESCRIPTION OF THE DRAWINGS

In order to describe technical solutions in some embodiments of the present disclosure more clearly, the accompanying drawings to be used in some embodiments of the present disclosure will be introduced briefly. Obviously, the accompanying drawings to be described below are merely some embodiments of the present disclosure, and a person of ordinary skill in the art can obtain other drawings according to those drawings. In addition, accompanying drawings in the following description may be regarded as schematic diagrams, and are not limitations on an actual size of a product, an actual process of a method and an actual timing of signals involved in the embodiments of the present disclosure.

DETAILED DESCRIPTION

Figure 1:
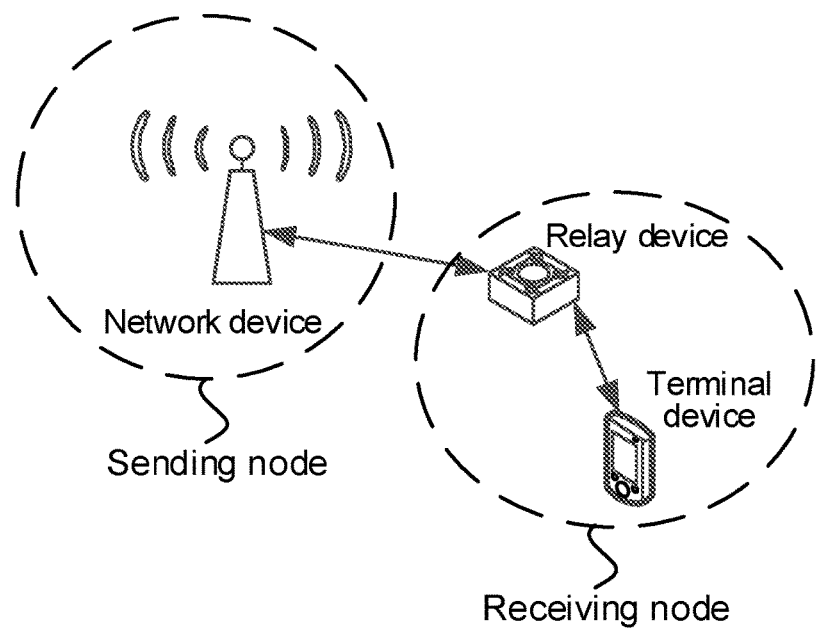
FIG. 1 is a structural diagram of a communication system in accordance with some embodiments.

The technical solutions in embodiments of the present disclosure will be described clearly and completely with reference to the accompanying drawings. Obviously, the described embodiments are merely some but not all of embodiments of the present disclosure. All other embodiments obtained on the basis of the embodiments of the present disclosure by a person of ordinary skill in the art shall be included in the protection scope of the present disclosure.

Unless the context requires otherwise, throughout the description and claims, the term "comprise" and other forms thereof such as the third-person singular form "comprises" and the present participle form "comprising" are construed as an open and inclusive meaning, i.e., "included, but not limited to". In the description of the specification, the term such as "one embodiment", "some embodiments", "exemplary embodiments". "example", "specific example" or "some examples" are intended to indicate that specific features, structures, materials or characteristics related to the embodiment(s) or example(s) are included in at least one embodiment or example of the present disclosure. Schematic representations of the above term do not necessarily refer to the same embodiment(s) or example(s). In addition, specific features, structures, materials, or characteristics described herein may be included in any one or more embodiments or examples in any suitable manner.

Hereinafter, terms such as "first" and "second" are only used for descriptive purposes, and are not to be construed as indicating or implying the relative importance or implicitly indicating the number of indicated technical features. Thus, a feature defined with "first" or "second" may explicitly or implicitly include one or more of the features. In the description of the embodiments of the present disclosure, the term "a plurality of" or "the plurality of" means two or more unless otherwise specified.

In the description of some embodiments, the terms "coupled" and "connected" and derivatives thereof may be used. For example, the term "connected" may be used in the description of some embodiments to indicate that two or more components are in direct physical or electrical contact with each other. As another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if" is, optionally, construed to mean "when" or "upon" or "in response to determining" or "in response to detecting", depending on the context. Similarly, depending on the context, the phrase "if it is determined" or "if [a stated condition or event] is detected" is optionally construed as "in a case where it is determined", "in response to determining", "in a case where [the stated condition or event] is detected", or "in response to detecting [the stated condition or event]".

The phase "applicable to" or "configured to" used herein means an open and inclusive expression, which does not exclude devices that are applicable to or configured to perform additional tasks or steps.

In addition, the phrase "based on" used is meant to be open and inclusive, since processes, steps, calculations or other actions "based on" one or more of the stated conditions or values may, in practice, be based on additional conditions or values exceeding those stated.

In order to ensure that the terminal can correctly receive the data/information sent by the network device, the terminal may synchronize with the network device by means of GPS synchronization, baseband synchronization, envelope detection synchronization and the like.

However, the process of GPS synchronization is relatively cumbersome and costly. For example, in a case where the terminal is a relay device (also called a repeater), the relay device needs to recalculate the phase difference between the GPS signal and the network device when the position of the relay device changes, and perform the synchronization process again. In some cases, it is not possible to synchronize with network devices without receiving a GPS signal.

The cost of the baseband synchronization is also relatively high. Although the cost of the envelope detection synchronization is low, the anti-interference ability is low.

In view of this, the embodiments of the present application provide a synchronization method, which is applied to a receiving node. The receiving node may include a field-programmable gate array (FPGA) and a processor. The receiving node encapsulates the local clock and radio frequency data through the FPGA and transmits them to a data processing unit. After receiving the encapsulated data, the processor performs a search of a synchronization point, determines the time calibration parameter, and returns the time calibration parameter to the FPGA. After receiving the time calibration parameter, the FPGA may update the configured synchronization information. For example, the time information in the synchronization information may be updated. In this way, the receiving node may accurately receive data from the network side according to the updated synchronization information subsequently.

It will be noted that, in the embodiments of the present application, the receiving node may also referred as a receiving device, a receiving end, a signal receiving device, and the like. The receiving node may be a mobile device, or a relay device or a relay system.

The technical solutions in embodiments of the present disclosure will be described in detail with reference to the accompanying drawings below.

As shown in FIG. 1, FIG. 1 being a communication system in accordance with embodiments of the present disclosure, the communication system may include a sending node and a receiving node. The sending node is communicatively connected to the receiving node.

The sending node may be used to send a downlink signal. For example, the sending node is an entity on the network side for transmitting or receiving signals. For example, the sending node may be a network device, such as any node of a small base, a wireless access point, a transmission receive point (TRP), a transmission point (TP) and some other access nodes.

The receiving node may include a relay device or a terminal device. The terminal device may be a mobile phone, a tablet computer or a computer with wireless transceiver function; alternatively, the terminal device may be a virtual reality (VR) device, an augmented reality (AR) device, a wireless terminal in industrial control, a wireless terminal in unmanned driving, a wireless terminal in telemedicine, a wireless terminal in a smart grid, a wireless terminal in a smart city, a smart home, a vehicle-mounted terminal, or the like.

The technical solutions of the embodiments of the present application may be applied to any communication system that supports communication, and the communication system may be the 3rd generation partnership project (3GPP) high-frequency wireless communication system, such as a 4th generation (4G) mobile communication system (e.g., a long-term evolution (LTE) system, evolved LTE (eLTE), or a worldwide interoperability for microwave access (WiMAX) communication system), a fifth generation (5G) mobile communication system (e.g., a new radio (NR) system or a new radio access technology (NR)), and a future communication system, (e.g., a sixth generation (6G) mobile communication system); alternatively, the communication system may be non-3GPP communication system, which is not limited.

It will be noted that the communication system described in the embodiments of the present application is to illustrate the technical solutions of the embodiments of the present application more clearly, and does not constitute a limitation to the technical solutions provided in the embodiments of the present application. It will be known to those skilled in the art that, with the evolution of communication systems and the emergence of other communication systems, the technical solutions provided in the embodiments of the present application are also applicable to the similar technical problems.

Figure 2:
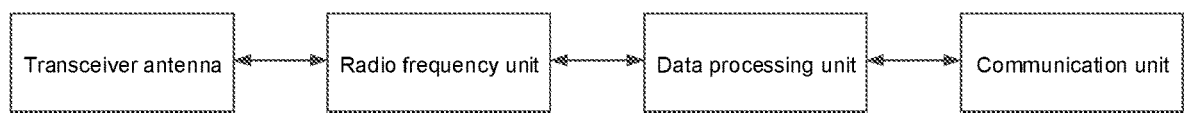
FIG. 2 is a structural diagram of receiving nodes, in accordance with some embodiments.

In an example, FIG. 2 shows a schematic diagram showing a structure of a receiving node. The receiving node may include a transceiver antenna, a radio frequency unit, a data processing unit, and a communication unit.

The transceiver antenna may be used to receive and transmit a signal. For example, the transceiver antenna may receive a downlink signal on the network side, and transmit the downlink signal to the user side. The transceiver antenna may be a single antenna, multiple antenna, array antenna, and the like.

The radio frequency unit may be used to adjust the received signal. For example, the radio frequency unit may adjust the frequency of the received signal.

In an example, the radio frequency unit may include a radio frequency front end and a radio frequency transceiver. The radio frequency front end may be used to filter and amplify a radio frequency signal. The radio frequency transceiver may be used to receive and transmit the radio frequency signal. For example, the radio frequency transceiver may include a receiver and a transmitter. The receiver may be used to receive the radio frequency signal, and the transmitter may be used to transmit the radio frequency signal. The radio frequency unit may further include a local oscillation circuit. The local oscillator circuit may be used to generate a carrier signal.

The above-mentioned receiver may include a heterodyne receiver (also referred to as a superheterodyne receiver), a zero-intermediate frequency (IF) receiver, a wide-band IF receiver, a low-IF receiver, and the like. These receivers will be described respectively below.

1-1. Heterodyne Receiver

The heterodyne receiver may mix the oscillating signal generated by the locally oscillator and the received signal, and adjust the received signal to a fixed-frequency intermediate frequency signal. The heterodyne receiver may automatically adjust the frequency of the oscillating signal generated by the locally oscillator according to the new frequency of the received signal. In this way, the frequency of the intermediate frequency signal may be guaranteed to be a fixed value.

Figure 3:
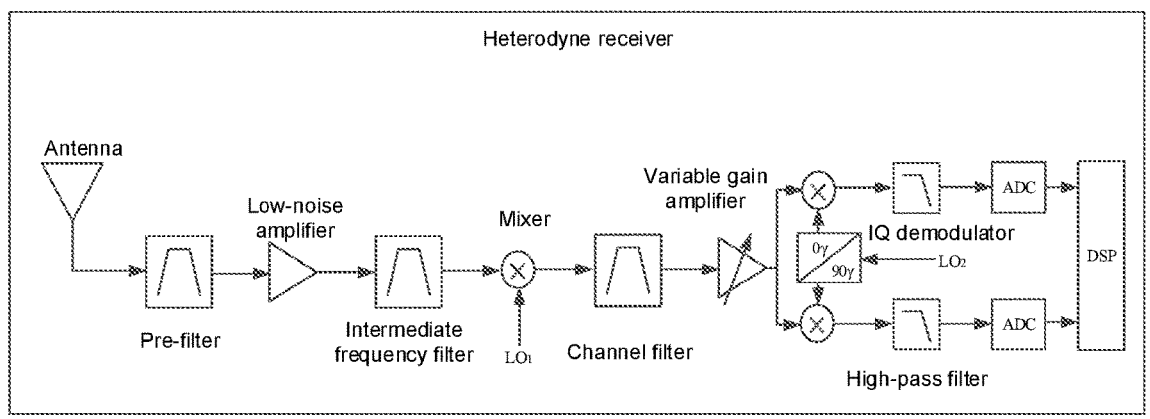
FIG. 3 is a structural diagram of a heterodyne receiver, in accordance with some embodiments.

For example, FIG. 3 is a schematic diagram showing a structure of the heterodyne receiver provided in the embodiments of the present disclosure. As shown in FIG. 3, the heterodyne receiver may include multiple components, for example, may include an antenna, a pre-filter, a low-noise amplifier, an intermediate frequency filter, a mixer, a channel filter, a variable gain amplifier, an in-phase quadrature (IQ) demodulator, a high-pass filter, and an analog-to-digital converter (ADC). The connection manner of the multiple components may be as shown in FIG. 2, which will not be described in detail.

1-2. Zero-IF Receiver

The zero-IF receiver may also be referred to as a direct conversion receiver, a homodyne receiver, or a synchronous receiver. The zero-IF receiver may directly demodulate the radio frequency modulated carrier to the baseband frequency, in which the signal may be detected directly, and the carried information may be recovered. The zero-IF receiver may generate, through the local oscillator, a synchronous detection signal with the same or similar frequency as the received signal, and adjust the frequency of the received signal by using the synchronous detection signal to obtain a signal with a preset frequency.

Figure 4:
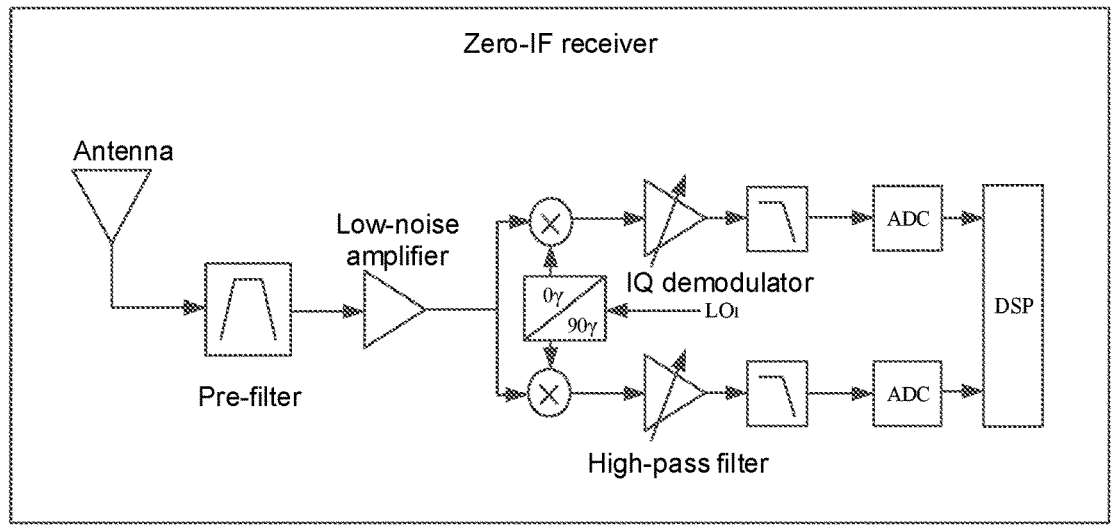
FIG. 4 is a structural diagram of a zero-intermediate frequency receiver, in accordance with some embodiments.

For example, FIG. 4 is a schematic diagram showing a structure of the zero-IF receiver provided in the embodiments of the present disclosure. As shown in FIG. 4, the zero-IF receiver may include multiple components; for example, the plurality of components may include an antenna, a pre-filter, a low-noise amplifier, an IQ demodulator, a variable gain amplifier, a high-pass filter, and an ADC. The connection manner of the multiple components may be as shown in FIG. 4, which will not be described in detail.

1-3. Wide-Band IF Receive

The wide-band IF receiver is of a double-conversion architecture. The wide-band IF receiver may convert the frequency of the radio frequency signal to an IF (referred to as a first stage), and then downconverts the IF to a baseband signal (referred to as a second stage).

Figure 5:
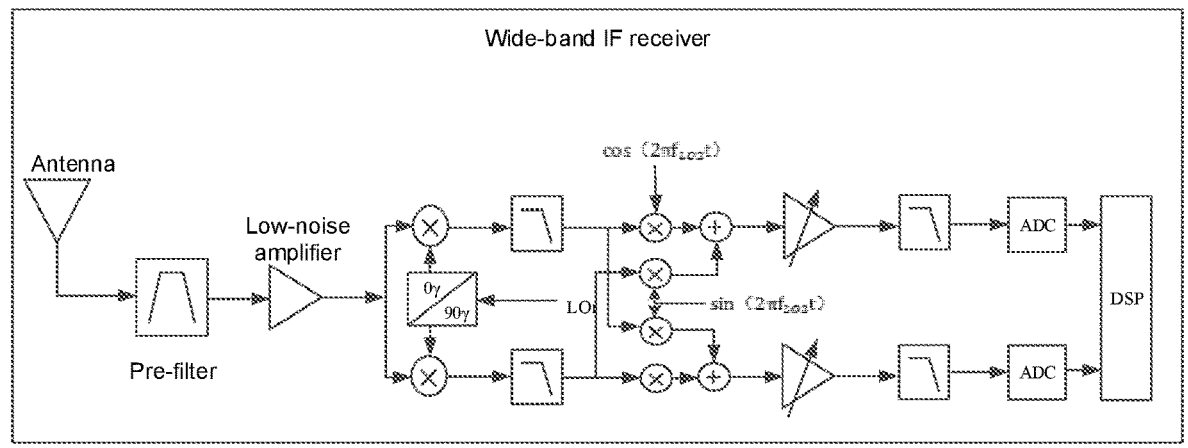
FIG. 5 is a structural diagram of an wide-band intermediate frequency receiver, in accordance with some embodiments.

For example, FIG. 5 shows a wide-band IF receiver provided by embodiments of the present application. The wide-band IF receiver may include multiple components. For example, the wide-band IF receiver may include an antennas, a pre-filters, a low-noise amplifiers, an IQ demodulators, a variable gain amplifiers, a high-pass filters, and an ADC. The connection manner of the multiple components may be as shown in FIG. 5, which will not be described in detail.

1-4. Low-IF Receiver

The low-IF receiver may be used to convert the frequency of the radio frequency signal to a low-IF frequency, and then convert the frequency into a baseband signal in the digital domain.

Figure 6:
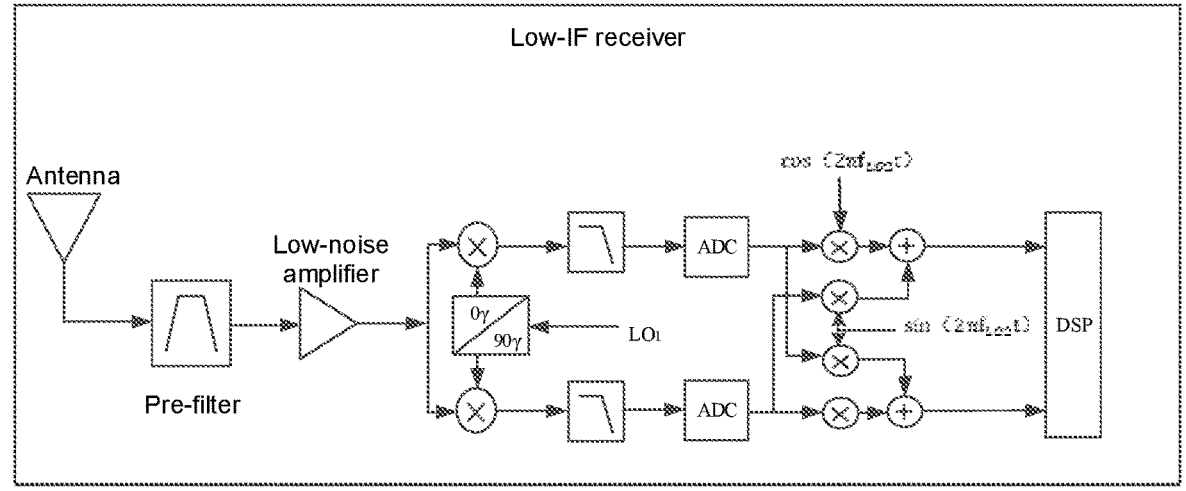
FIG. 6 is a structural diagram of a low-intermediate frequency receiver, in accordance with some embodiments.

For example, FIG. 6 is a schematic diagram showing a structure of the low-IF receiver provided in the embodiments of the present disclosure. As shown in FIG. 6, the low-IF receiver may include multiple components, and the plurality of components may include an antenna, a pre-filter, a low-noise amplifier, an IQ demodulator, a variable gain amplifier, a high-pass filter, and an ADC. The connection manner of the multiple components may be as shown in FIG. 6, which will not be described in detail.

It will be noted that the receivers described above are only exemplary, and may also be other types of receivers, which will not be described in detail. In the embodiment of the present application, the transmitter may be of the same architecture as the receiver. For example, the transmitter may include a heterodyne transmitter, a zero-IF transmitter, a wide-band IF transmitter, and a low-IF transmitter. Of course, the transmitter may be of a different architecture than the receiver. For example, the receiver is a heterodyne receiver, and the transmitter may be a heterodyne transmitter or a zero-IF transmitter, which is not limited.

The data processing unit in FIG. 2 may be used for signal processing. In some embodiments, the data processing unit may be of an architecture of a digital signal processing (DSP) chip and an FPGA, an architecture of an FPGA and an advanced RISC machine (ARM), an architecture of an FPGA and a central processing unit (CPU), an architecture of a system on chip (SOC), or the like. These architectures of the data processing units are described below respectively.

2-1. Architecture of DSP+FPGA

Figure 7:
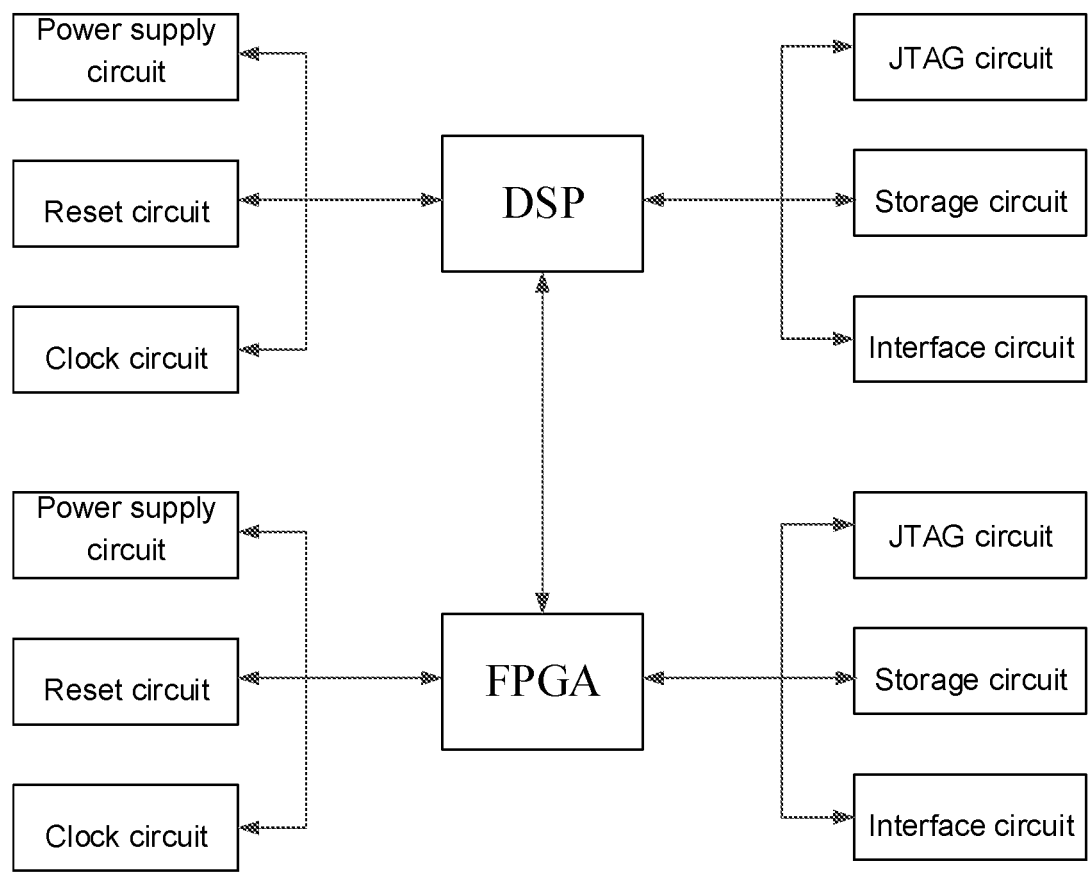
FIG. 7 is a structural diagram of a data processing unit, in accordance with some embodiments.

The architecture of DSP+FPGA may include DSP, FPGA and corresponding circuits. DSP may be connected to FPGA through the local bus. For example, FIG. 7 is a diagram of the architecture of DSP+FPGA provided by the embodiments of the present application. The architecture of DSP+FPGA may include a power supply circuit, a reset circuit, a joint test action group (JTAG) circuit, a storage circuit, an interface circuit, and a clock circuit.

The power circuit may be used to power the system/chip. The reset circuit may be used for system reset. The clock circuit may be used to provide a crystal oscillator clock signal. The JTAG circuit may be used to provide program download and debug functions. The storage circuit may be used to store the FPGA data (e.g., initialization data). The interface circuit may be used to provide multiple types of interfaces, for example, which may include a serial peripheral interface (SPI), an inter-integrated circuit (I2C), and a double data rate (DDR) interface.

2-2. Architecture of FPGA+ARM

Figure 8:
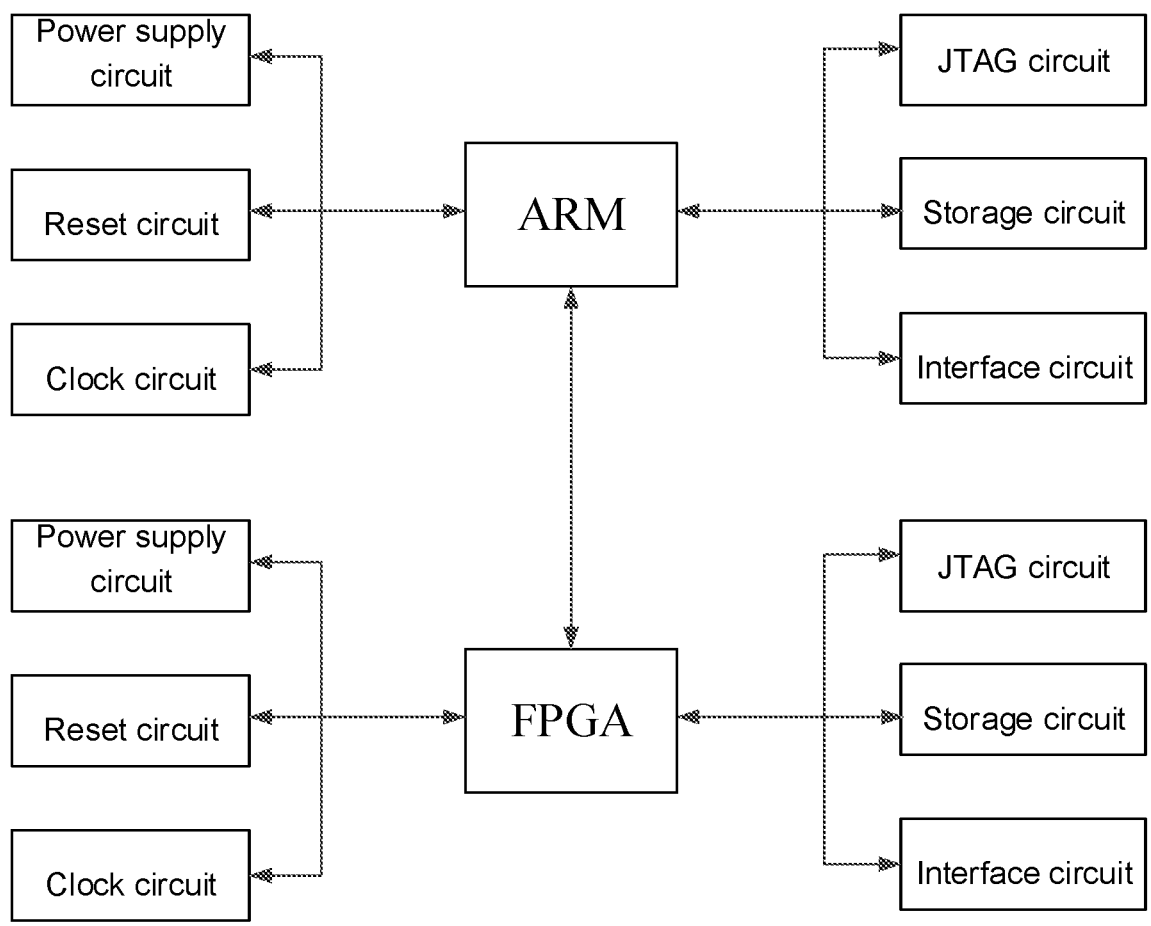
FIG. 8 is a structural diagram of a data processing unit, in accordance with some embodiments.

The architecture of FPGA+ARM may include FPGA, ARM and corresponding circuits. The ARM may be connected to the FPGA through a local bus, as shown in FIG. 8, FIG. 8 showing an architecture of ARM+FPGA provided in the embodiments of the present application. The architecture of ARM+FPGA may include a power supply circuit, a reset circuit, a JTAG circuit, a storage circuit, an interface circuit, and a clock circuit. As for the specific functions of the circuits, reference may be made to the description in 2-1, and will not be repeated here.

2-3. Architecture of FPGA+CPU

Figure 9:
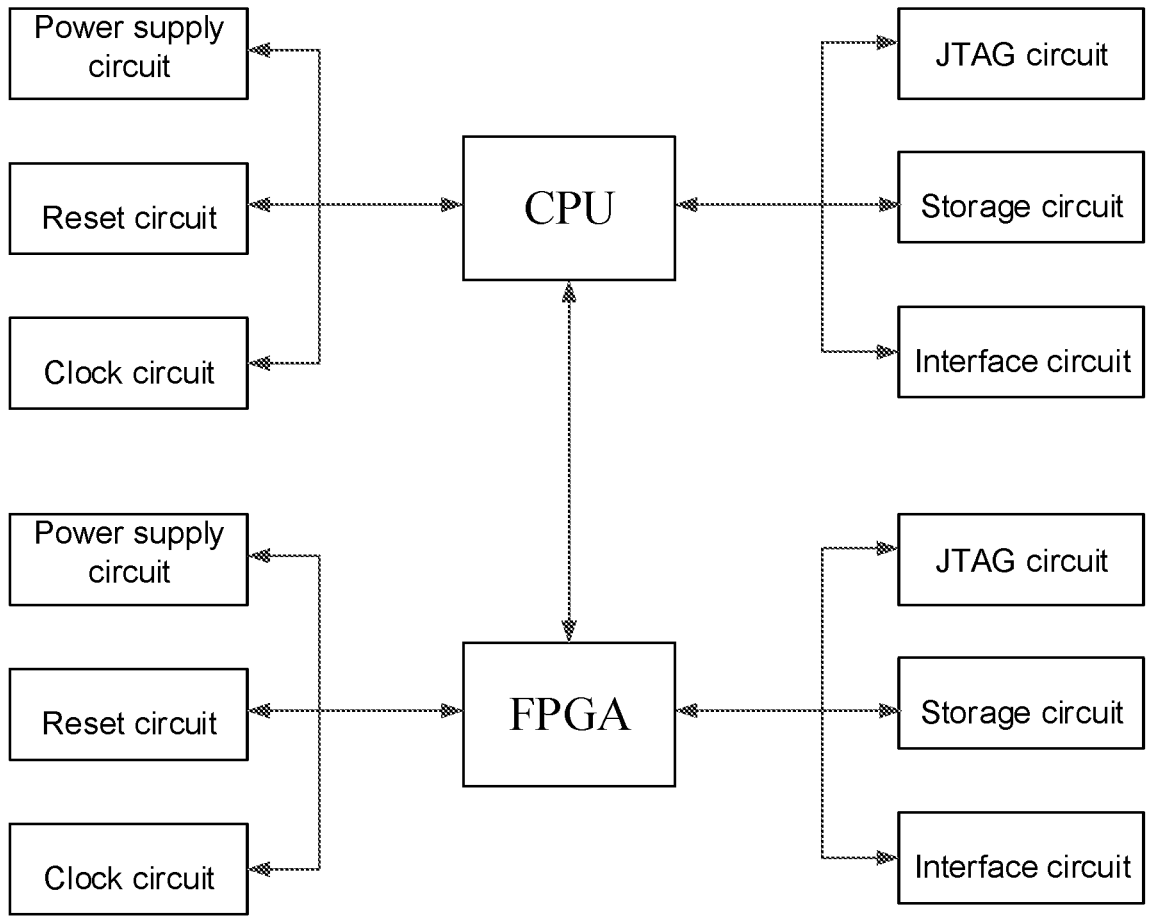
FIG. 9 is a structural diagram of a data processing unit, in accordance with some embodiments.

The architecture FPGA+CPU may include FPGA, CPU and corresponding circuits. The CPU may be connected to the FPGA through a local bus, for example, as shown in FIG. 9, FIG. 9 showing an architecture of FPGA+CPU provided in the embodiments of the present application. The architecture of FPGA+CPU may include a power supply circuit, a reset circuit, a JTAG circuit, a storage circuit, an interface circuit, and a clock circuit. As for the specific functions of the circuit, reference may be made to the description in 2-1, and will not be repeated here.

2-4. Architecture of SOC

Figure 10:
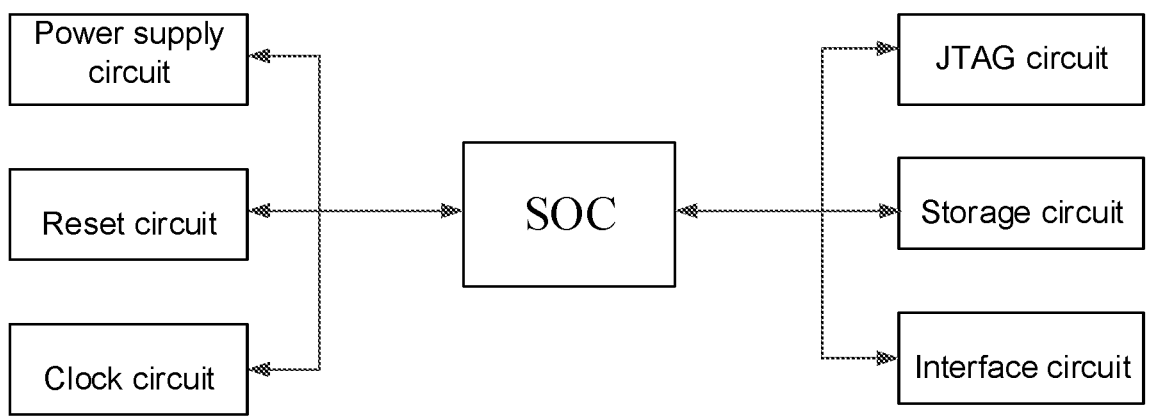
FIG. 10 is a structural diagram of a data processing unit, in accordance with some embodiments.

The architecture of SOC may be a chip composed of FPGA and ARM/CPU, which has functions of FPGA and processor. For example, FIG. 10 shows an architecture of SOC provided in the embodiments of the present application. The architecture of SOC may include a power supply circuit, a reset circuit, a JTAG circuit, a storage circuit, an interface circuit, and a clock circuit. As for the specific functions of the circuit, reference may be made to the description in 2-1, and will not be repeated here.

It will be noted that the above architectures are only an example, and the data processing unit may also adopt other architectures, which are not limited.

The communication unit in FIG. 2 may be used for the transmission of signals (e.g., the radio frequency signal and the 5G signal) between the front end and the back end of the relay device. In some embodiments, the communication unit may implement signal transmission by means of optical communication, ethernet communication, wireless-fidelity (WIFI) communication, and the like. These manners will be described respectively below.

3-1. Optical Communication

The optical communication refers to the transmission of signals by means of an optical module and optical fiber. The optical module is an optoelectronic device that performs photoelectric and electro-optical conversion. The transmitting end of the optical module may convert an electrical signal into an optical signal, and the receiving end of the optical module may convert an optical signal into an electrical signal. Based on different encapsulation mode, the optical module may include a small form pluggable (SFP), SFP+, and gigabit interface converter (GBIC).

3-2. Ethernet Communication

Ethernet is a computer local area network technology. The contents of the physical layer connection, electronic signal and medium access layer protocol of Ethernet may be found in the institute of electrical and electronics engineers (IEEE) 802.3 standard.

3-3. WIFI Communication

WiFi is a wireless local area network technology, and the radio frequency band of WiFi may include 2.4 G Hertz (Hz), 5 GHZ, and 60 GHz.

It will be noted that, in the embodiments of the present application, the FPGA may be used to generate clock data, acquire radio frequency data of ADC and radio frequency transceiver, and encapsulate/pack the radio frequency data and clock data.

Figure 11:
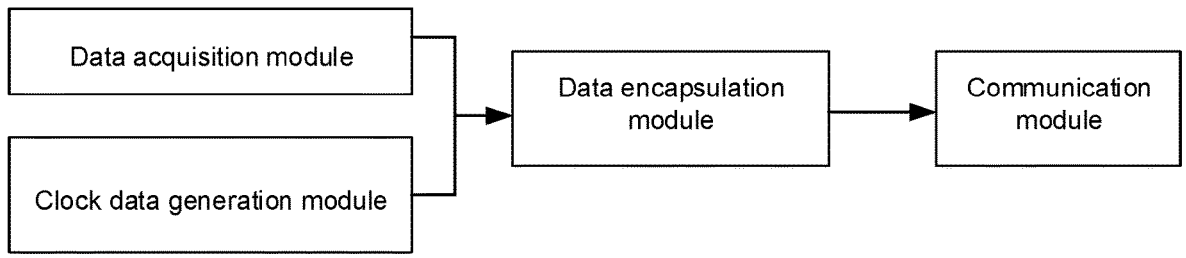
FIG. 11 is a structural diagram of a field-programmable gate array (FPGA), in accordance with some other embodiments.

In an example, as shown in FIG. 11, which is a schematic diagram showing a structure of a FPGA in accordance with some embodiments of the present application, FPGA includes a data acquisition module, a clock data generation module, a data encapsulation module and a communication module.

The clock data generation module may be used to generate a local clock (or time data). The form of the local clock may be a form of standard time, pulse per second (PPS), or 5 milliseconds (ms)/10 ms/20 ms.

Figure 12:
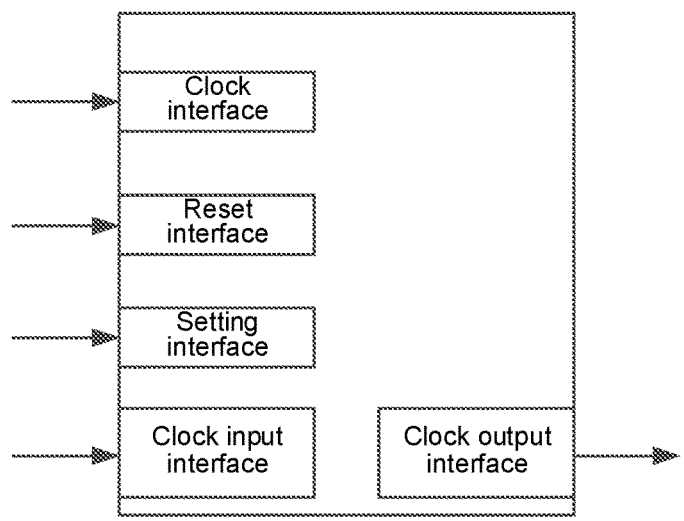
FIG. 12 is a structural diagram of a clock data generation module, in accordance with some embodiments.

In an example, as shown in FIG. 12, the clock data generation module includes a clock interface, a reset interface, a setting interface, a clock input interface, and a clock output interface.

The data acquisition module is mainly used to acquire the data of ADC or the radio frequency transceiver.

Figure 13:
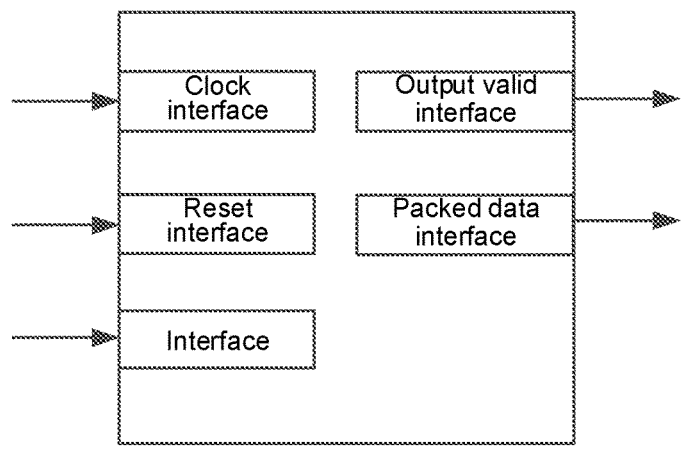
FIG. 13 is a structural diagram of a data acquisition module, in accordance with some embodiments.

In an example, as shown in FIG. 13, the data acquisition module may include a clock interface, a reset interface, an interface (JESD204, etc.), an output valid interface, and a packed data interface.

The data encapsulation module is mainly used to encapsulate/pack time data and acquired data point-to-point. Point-to-point may refer to that a piece of data corresponds to a time. For example, the received radio frame data and the local clock when the radio frame data is received may be encapsulated/packed point by point.

Figure 14:
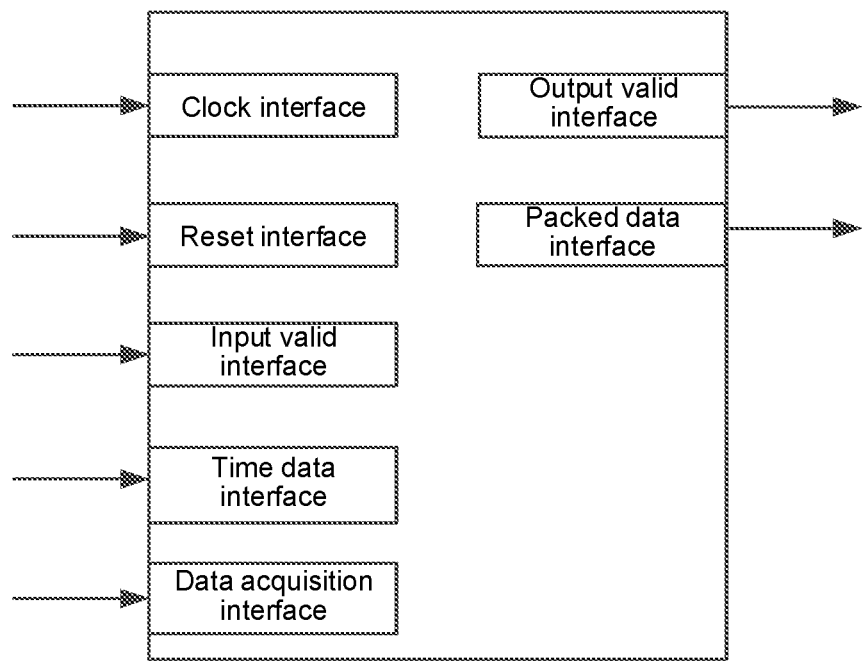
FIG. 14 is a structural diagram of a data encapsulation module, in accordance with some embodiments.

In an example, as shown in FIG. 14, the data encapsulation module may include a clock interface, a reset interface, an input valid interface, a time data interface, a data acquisition interface, an output valid interface, and a packed data interface.

The communication module is mainly used to transfer the encapsulated/packed data to the processor through the local bus.

Figure 15:
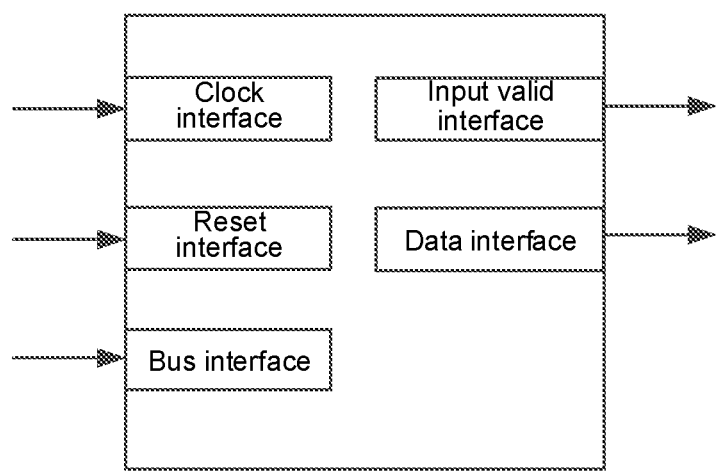
FIG. 15 is a structural diagram of a communication module, in accordance with some embodiments.

In an example, as shown in FIG. 15, the communication module may include a clock interface, a reset interface, an input valid interface, a data interface, and a bus interface.

It will be noted that, in the embodiments of the present application, in a case where the data processing unit is of an architecture of SOC, it may be possible to transmit data in a form of direct memory access (DMA), or transmit data in a form of direct memory read.

In the embodiments of the present application, the processor is mainly used to determine the location information of the synchronization point by performing a search of the synchronization signal. The synchronization signal may be a signal of synchronization signal block (SSB). The SSB signal may include a primary synchronization signal (PSS), a secondary synchronization signal (SSS), and a physical broadcast channel (PBCH).

The PSS/SSS is mainly used for the terminal to perform downlink synchronization. For example, clock synchronization, radio frame synchronization, symbol synchronization, and the like. The PSS/SSS may also be used for the terminal to acquire the identity (ID) of a neighbourhood.

Figure 16:
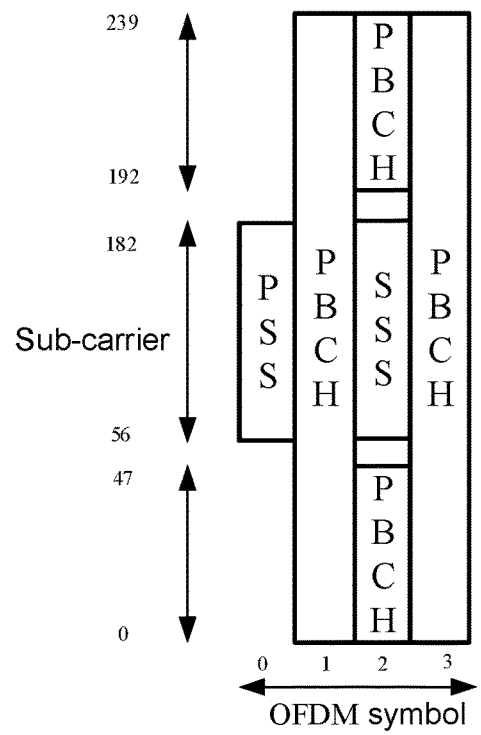
FIG. 16 is a structural diagram of a synchronization signal, in accordance with some embodiments.

In an example, as shown in FIG. 16, in the time domain, PBCH and PSS/SSS occupy 4 orthogonal frequency division multiplexing (OFDM) symbols (respectively OFDM symbol 0 to OFDM symbol 3). In the frequency domain, PBCH and PSS/SSS occupy 20 resource blocks (RBs), i.e., 240 sub-carriers (sub-carrier 0 to sub-carrier 239). The locations of PBCH and PSS/SSS in the frequency domain may be set as required.

The synchronization method provided by the embodiments of the present application will be described below with reference to the communication system shown in FIG. 1.

Figure 17:
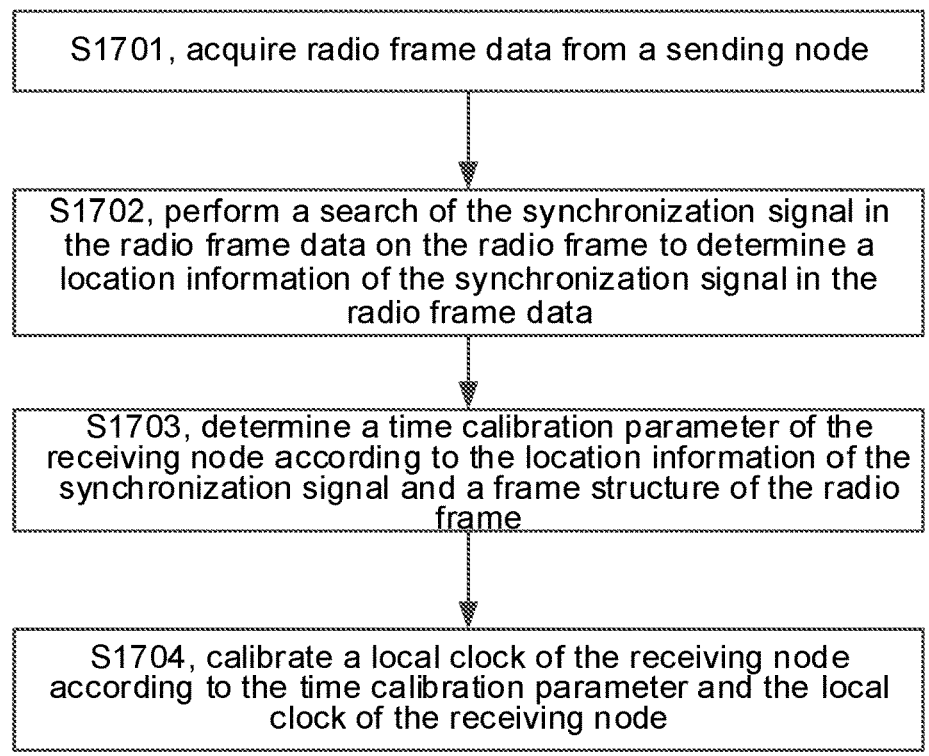
FIG. 17 is a flow diagram of a synchronization method, in accordance with some embodiments.

As shown in FIG. 17, which is a synchronization method provided by the embodiments of the present application, the method may be applied to the receiving node shown in FIG. 1. The method may include S1701 to S1704.

In S1701, radio frame data from a sending node is acquired.

The sending node may be the sending node in FIG. 1. Radio frame data may also referred to as radio frequency data and synchronization data. The radio frame data includes a synchronization signal. The radio frame data may be carried on a radio frame. The radio frame may be an NR radio frame or an LTE radio frame.

In an example, the radio frame may include at least one candidate time-frequency location periodically distributed, the candidate time-frequency location is used to carry the synchronization signal, and a candidate time-frequency location corresponds to a plurality of consecutive time-domain symbols (e.g., OFDM symbols) in a sub-frame and a plurality of consecutive frequency domain units (e.g., sub-carriers).

Figure 18:
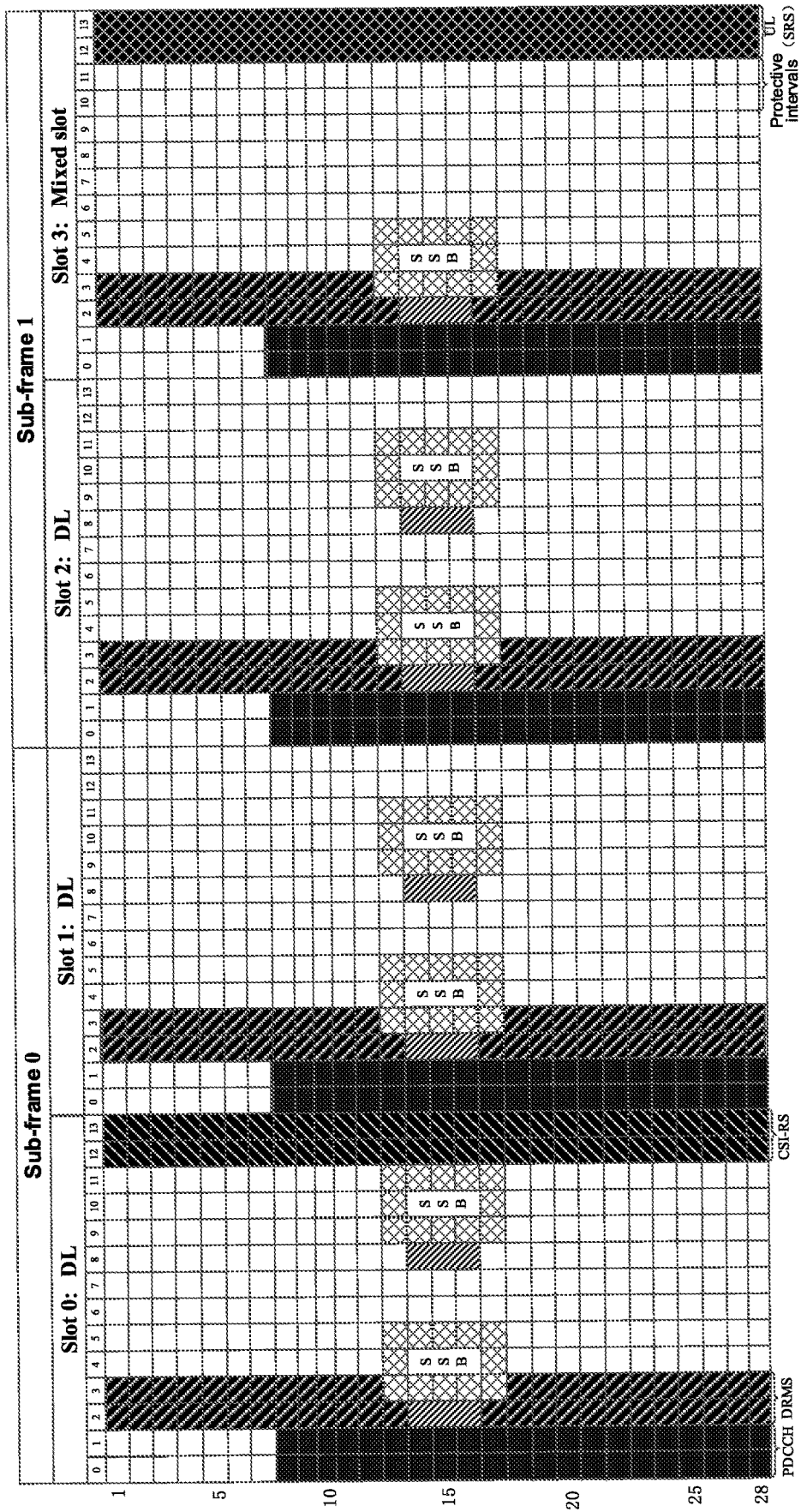
FIG. 18 is a schematic diagram of a frame structure in radio frame, in accordance with some embodiments.

For example, as shown in FIG. 18, which is a schematic diagram showing a structure of a NR radio frame in accordance with the embodiments of the present application, the radio frame includes Sub-frame 0 and Sub-frame 1. A single sub-frame includes two slots. A single slot may include 14 OFDM symbols (0 to 13 in the figure each correspond to an OFDM symbol). The radio frame may also include a plurality of sub-carriers (Sub-carrier 1 to Sub-carrier 28 respectively). The radio frame is also used to carry other signals. For example, the radio frame is also used to carry physical downlink control channel (PDCCH), demodulation reference signal (DMRS), channel state information-reference signal (CSI-RS), and uplink (UL) (sounding reference signal (SRS)).

In FIG. 18, the candidate time-frequency location may be a time-frequency location occupied by SSB. For example, the candidate time-frequency location may include OFDM symbol 2 to OFDM symbol 5, and OFDM symbol 8 to OFDM symbol 11 that are in Slot 0, Slot 1, Slot 2, and Slot 3, and Sub-carrier 13 to Sub-carrier 17.

In a possible implementation, with reference to the receiving node in FIG. 2, the receiving node may receive the radio frame data from the sending node through the transceiver antenna. After receiving the radio frame data, the receiving node may encapsulate the radio frame data and the local clock through the FPGA to obtain the encapsulated radio frame data. The encapsulated radio frame data may include multiple sub-frame data and a local clock corresponding to each sub-frame data. For example, with reference to the radio frame structure shown in FIG. 18. The encapsulated radio frame data may include data carried by Sub-frame 0 and a local clock when Sub-frame 0 is received, and data carried by Sub-frame 1 and a local clock when Sub-frame 1 is received.

The local clock may refer to a clock generated when the receiving node receives the radio frame data. For example, as shown in FIG. 11, after receiving the radio frame data, the FPGA may acquire the corresponding local clock from the clock data generation module. After encapsulating the received radio frame data and the local clock, the FPGA transmits them to the processor. After receiving the encapsulated radio frame data, the processor may split the encapsulated radio frame data to obtain the radio frame data and the corresponding local clock.

Further, in order to reduce the interference of noise signals to the radio frame data, after receiving the radio frame data from the sending node, the receiving node may filter the radio frame data to filter out the noise signals in the radio frame data.

In S1702, a search of the synchronization signal in the radio frame data is performed on the radio frame to determine the location information of the synchronization signal in the radio frame data.

The location information of the synchronization signal may be used to indicate a time-frequency location of the synchronization signal in the radio frame. For example, the location information of the synchronization signal may include time domain symbols and frequency domain units of the synchronization signal in the radio frame. The time domain symbol may refer to an OFMD symbol of the radio frame, and the frequency domain unit may refer to a sub-carrier of the radio frame.

In an example, the receiving node may down-sample the radio frame data to determine a starting location of the synchronization signal in the radio frame, and determine the location information of the synchronization signal in the radio frame according to the starting location of the synchronization signal in the radio frame.

For example, the receiving node may perform a down-sampling search on the radio frame data according to a preset step size, and detect whether radio frame data corresponding to each sampling point includes a signal. The sampling point may also be referred to as a frequency point. Different sampling points have different time-frequency locations in the radio frame. A frequency point may correspond to a frequency range. A piece of radio frame data may include a plurality of frequency points. The preset step size may refer to the number of frequency points. In this way, the receiving node may sample the plurality frequency points according to the preset step size, and detect whether the radio frame data corresponding to each sampling point includes a signal, which reduces the number of frequency points to be detected, so that the amount of calculation of the receiving node is reduced.

For each sampling point, the receiving node may determine whether the radio frame data corresponding to the sampling point includes/carries a signal according to envelope information of the radio frame data corresponding to the sampling point. The envelope information may be used for synchronization detection.

In an example, if the radio frame data corresponding to a sampling point does not include a signal, the receiving node may switch frequency points, and continue to detect whether radio frame data corresponding to a switched frequency point includes a signal. For example, if the current frequency point is Frequency point 1, and the receiving node detects that the radio frame data corresponding to Frequency point 1 does not include a signal, the receiving node may sample the radio frame data according to the preset step size to obtain a next frequency point (e.g., Frequency point 2) of Frequency point 1. The receiving node may continue to detect the radio frame data corresponding to Frequency point 2. If the radio frame data corresponding to Frequency point 2 does not include a signal, the receiving node may continue to detect a next frequency point of Frequency point 2 until the radio frame data including a signal is detected.

In another example, after detecting the radio frame data including a signal, the receiving node may detect whether the radio frame data includes the synchronization signal (e.g., PSS).

For example, the receiving node may calculate a signal strength value corresponding to each of the multiple frequency points that are adjacent to the frequency point (or sampling point), and use a frequency point with the largest signal strength value as the frequency point corresponding to the synchronization signal. In this way, according to a frequency corresponding to the frequency point, the receiving node may determine multiple frequency domain units (i.e., sub-carriers) matching the frequency in the preconfigured radio frame.

It will be noted that, in the embodiments of the present application, frequency intervals of sub-carriers in a radio frame are preconfigured, and different sub-carriers correspond to different frequencies. Therefore, the receiving node may determine a frequency corresponding to each sub-carrier according to the preconfigured configuration information (e.g., frequency intervals, number of slots) of the radio frame.

Further, after determining the sub-carriers corresponding to the synchronization signal in the radio frame, the receiving node may use the start time at which the plurality of sub-carriers are detected as a starting time domain location of the synchronization signal.

In this way, the receiving node may determine the location information of the synchronization signal in the radio frame according to the time domain location and the frequency domain location of the synchronization signal in the radio frame.

In S1703, a time calibration parameter of the receiving node is determined according to the location information of the synchronization signal and a frame structure of the radio frame.

The time calibration parameter may be used to calibrate the local clock of the receiving node.

In an example, after determining the candidate location information of the synchronization signal in the radio frame, the receiving node may determine the time calibration parameter of the receiving node according to the frame structure of the radio frame.

The receiving node may be preconfigured with the frame structure of the radio frame. In this way, the receiving node may determine the preconfigured candidate location information (including time domain location and frequency domain location) of the synchronization signal in the radio frame according to the frame structure of the radio frame.

It will be noted that, in an actual application scenario, in a case where the radio frame data is affected by other signals, there may be a deviation between the time when the receiving node receives the radio frame data of the sending node and the reserved/preconfigured receiving time.

In an example, after determining the preconfigured candidate time-frequency information of the synchronization signal in the radio frame, the receiving node may determine the time domain information (i.e., the theoretical time) of the synchronization signal in the radio frame. In this way, the receiving node may determine the time calibration parameter of the synchronization signal according to the time domain information of the synchronization signal in the radio frame and the local clock (i.e., the actual time) corresponding to the radio frame.

For example, the receiving node may use the time domain information of the synchronization signal in the radio frame as the time calibration parameter.

In another example, the receiving node may determine the time calibration parameter according to a difference between the time domain information of the synchronization signal in the radio frame and the local clock when the radio frame data is received.

In S1704, the local clock of the receiving node is calibrated according to the time calibration parameter and the local clock of the receiving node.

The local clock of the receiving node may refer to a clock signal when the receiving node receives the radio frame data.

In an example, in a case where the time calibration parameter is the time domain information of the synchronization signal in the radio frame, according the time calibration parameter and the local clock of the receiving node, the receiving node may determine the difference between the two, and calibrate the local clock of the receiving node according to the difference.

In another example, in a case where the time calibration parameter is the difference between the time domain information of the synchronization signal in the radio frame and the local clock when the radio frame data is received, the receiving node may calibrate the local clock according to the difference, so that the receiving node may be synchronized with the sending node.

In an application scenario, with reference to the architecture of any receiving node in FIGS. 7 to 10, after determining the time calibration parameter, the processor (DSP, ARM or CPU) may return the time calibration parameter to the FPGA through the local bus; after receiving the time calibration parameter, the FPGA may calibrate the local clock according to the time calibration parameter.

Based on the technical solution shown in FIG. 17, after acquiring the radio frame data, the receiving node may perform a search of a synchronization point on the radio frame used to carry the radio frame data, so as to determine the location information of the synchronization signal included in the radio frame data. Thus, the receiving node may determine the time calibration parameter of the receiving node according to the location information of the synchronization signal and the frame structure of the radio frame. Moreover, the local clock is calibrated by using the time calibration parameter to ensure the synchronization between the receiving node and the sending node. Compared with the GPS synchronization, the technical solution provided by the embodiments of the present application does not need to calculate the phase difference between the GPS and the base station, so that the workload of the receiving node is reduced, and the synchronization accuracy is improved.

The method provided by the embodiments of the present application will be described below by taking an example in which the receiving node is the relay device, and the relay device including the architecture shown in FIG. 9.

Figure 19:
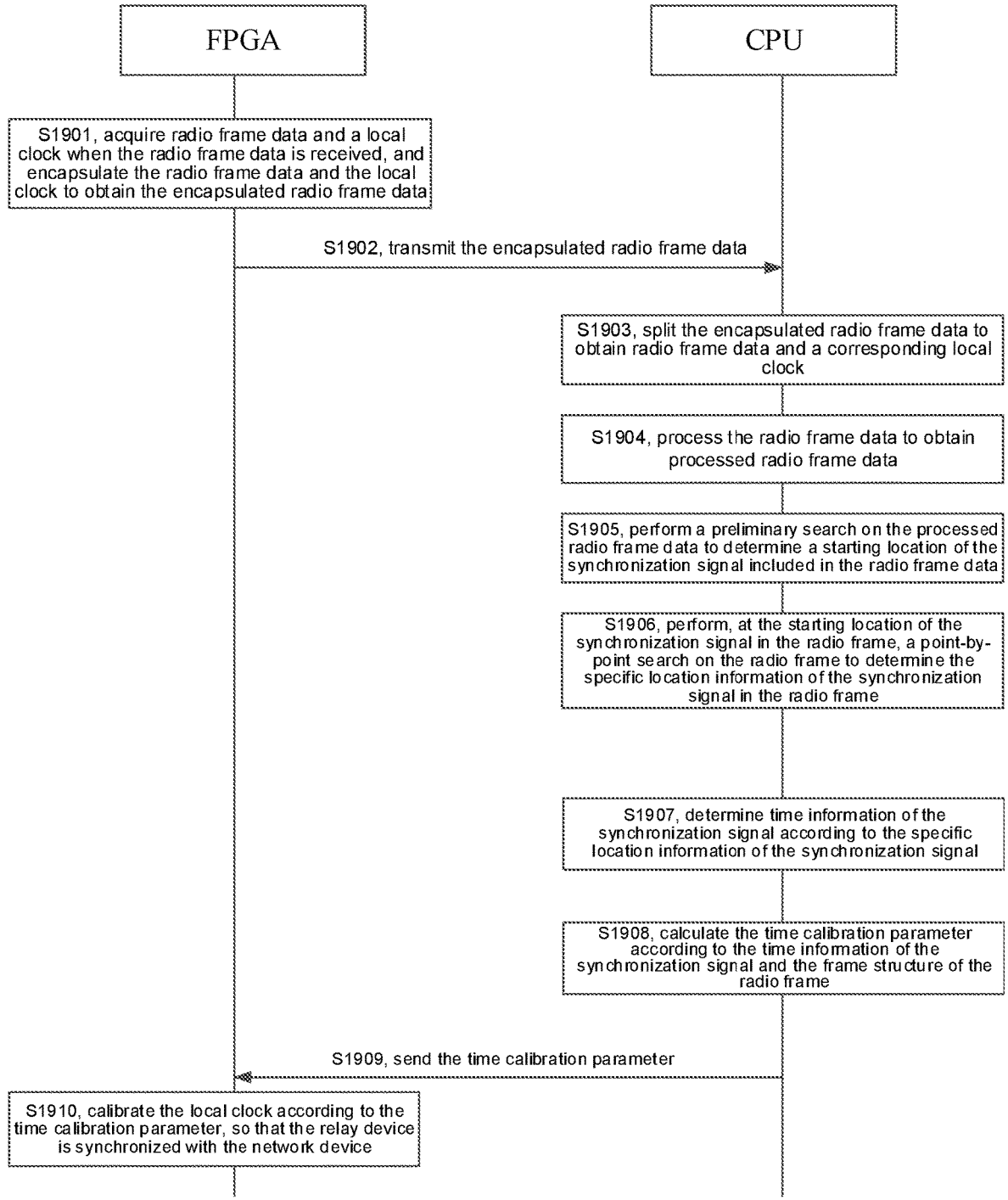
FIG. 19 is a flow diagram of a synchronization method, in accordance with some embodiments.

As shown in FIG. 19, the method provided by the embodiments of the present application may include S1901 to S1910.

In S1901, the FPGA acquires the radio frame data and a local clock when the radio frame data is received, and encapsulates the radio frame data and the local clock to obtain the encapsulated radio frame data.

In S1902, the FPGA transmits the encapsulated radio frame data to the CPU. Correspondingly, the CPU receives the encapsulated radio frame data.

In S1903, the CPU splits the encapsulated radio frame data to obtain radio frame data and a corresponding local clock.

The CPU splits the encapsulated radio frame data may mean that the CPU splits the encapsulated radio frame data and the local clock, so that a local clock corresponding to each frame data in multiple radio frame data of the radio frame data may be obtained.

In S1904, the CPU processes the radio frame data to obtain processed radio frame data.

Processing the radio frame data may include filtering the radio frame data.

In S1905, the CPU performs a preliminary search on the processed radio frame data to determine a starting location of the synchronization signal included in the radio frame data.

The starting location of the synchronization signal refers to a starting location of the synchronization signal in the radio frame.

In an example, the CPU performs a preliminary search on the processed radio frame data to determine the starting location of the synchronization signal. For example, the CPU may down-sample the processed radio frame data to reduce the amount of processing calculations. The CPU may filter the processed radio frame data again, and extract envelope information in the radio frame data. The CPU detects whether the envelope information includes a signal. If the signal is included, the CPU detects whether the radio frame data includes the PSS.

Detecting whether the radio frame data includes the PSS by the CPU may include: calculating, for each sampling point, a signal strength value of the radio frame data corresponding to the sampling point. If the signal strength value is greater than or equal to a preset threshold, the CPU may determine that the radio frame data corresponding to the sampling point includes the PSS; if the signal strength value is less than the preset threshold, the CPU may determine that the radio frame data corresponding to the sampling point does not include the PSS.

In the case that the radio frame data corresponding to the sampling point does not include the PSS, the CPU may perform frequency point switching until a sampling point including the PSS is detected. In a case where the radio frame data corresponding to the sampling point includes the PSS signal, the CPU may calculate the signal strengths of the frequency points adjacent to the sampling point, and use location information of a sampling point with the largest signal strength value as the starting location of the synchronization signal.

In S1906, at the starting location of the synchronization signal in the radio frame, the CPU performs a point-by-point search on the radio frame to determine the specific location information of the synchronization signal in the radio frame.

In an example, the CPU may perform a correlation calculation of the synchronization signal near the sampling point with the largest signal strength value (e.g., an adjacent frequency point), so as to obtain the frequency point with the highest signal strength near the sampling point. In this way, the CPU may use the location of the frequency point with the highest signal strength as the specific location information of the synchronization signal in the radio frame.

In S1907, the CPU determines the time information of the synchronization signal according to the specific location information of the synchronization signal.

The CPU may determine the frame data where the synchronization signal is located according to the specific location information of the synchronization signal in the radio frame. Based on the plurality of frame data in S1903 and the corresponding local clocks, the CPU may determine the local clock corresponding to the synchronization signal.

In S1908, the CPU calculates the time calibration parameter according to the time information of the synchronization signal and the frame structure of the radio frame.

In S1909, the CPU sends the time calibration parameter to the FPGA. Correspondingly, the FPGA receives the time calibration parameter from the CPU.

In S1910, the FPGA calibrates the local clock according to the time calibration parameter, so that the relay device is synchronized with the network device.

For details of S1909 and S1910 above, reference may be made to the description of S1703 and S1904 above, and are not repeated here.

Based on the technical solution in FIG. 19, the relay device packs the local clock and radio frame data into the processor at the same time, and performs a search of the synchronization point on the processor side, which can effectively reduce the complexity of the FPGA program and realize complex synchronization. Algorithm to improve synchronization accuracy.

It will be pointed out that the various embodiments of the present application may be used for reference from each other, for example, the same or similar steps, embodiments of the method, embodiments of the system and embodiments of the device may be used for reference from each other, which is not limited.

In some embodiments of the present disclosure, a synchronization apparatus may be divided into functional modules or functional units according to the foregoing embodiments of the method. For example, the synchronization apparatus may be divided in a way that each functional module or functional unit corresponds to a function, or that two or more functions are integrated into one processing module. The integrated module may be implemented in a form of hardware or in a form of software functional module or functional unit. The division of modules or units in the embodiments of the present disclosure is schematic, and is only a division according to logical functions, and there may be other division manners in actual implementation.

Figure 20:
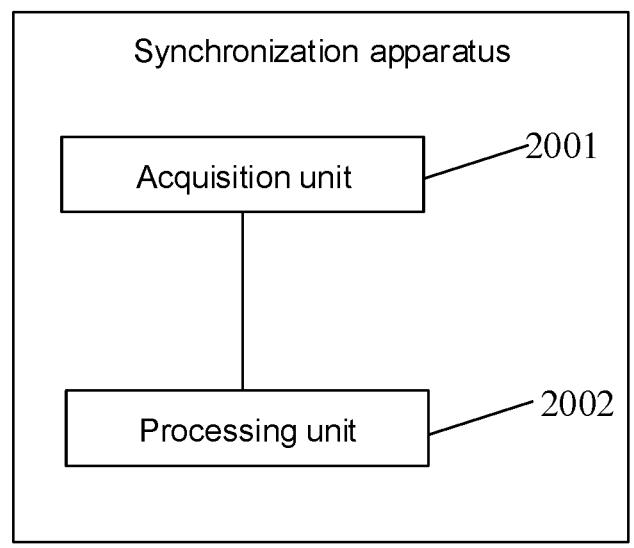
FIG. 20 is a structural diagram of a synchronization apparatus, in accordance with some embodiments.

As shown in FIG. 20, which is a schematic structural diagram of a synchronization apparatus provided by the embodiments of the present application, the synchronization apparatus is applied to a receiving node, and the apparatus includes an acquisition unit 2001 and a processing unit 2002.

The acquisition unit 2001 is configured to acquire radio frame data from a sending node. The radio frame data is carried on a radio frame, and the radio frame data includes a synchronization signal.

The processing unit 2002 is configured to perform a search of the synchronization signal in the radio frame data on the radio frame to determine location information of the synchronization signal in the radio frame data. The location information of the synchronization signal may be used to indicate a time-frequency location of the synchronization signal in the radio frame.

The processing unit 2002 is further configured to determine a time calibration parameter of the receiving node according to the location information of the synchronization signal and a frame structure of the radio frame.

The processing unit 2002 is further configured to calibrate a local clock of the receiving node according to the time calibration parameter and the local clock of the receiving node, so that the receiving node is synchronized with the sending node.

In some embodiments, the processing unit 2002 is configured to: perform a down-sampling search on the radio frame data to determine a starting location of the synchronization signal in the radio frame; and determine the location information of the synchronization signal in the radio frame according to the starting location of the synchronization signal in the radio frame.

In some embodiments, the processing unit 2002 is configured to: perform a down-sampling search on the radio frame data according to a preset step size; detect whether radio frame data corresponding to each sampling point includes a signal, different sampling points having different frequency domain locations in the radio frame; and determine, if radio frame data corresponding to a sampling point includes a signal and a signal strength value of the signal is greater than a preset threshold, the starting location of the synchronization signal according to a time-frequency location of the sampling point in the radio frame.

In some embodiments, the processing unit 2002 is configured to determine whether a signal exists in the radio frame data corresponding to the sampling point according to envelope information of the radio frame data of the sampling point.

In some embodiments, the processing unit 2002 is further configured to: switch the frequency point if the radio frame data corresponding to the sampling point does not include a signal; and detect whether a signal exists in radio frame data corresponding to a switched frequency point.

In some embodiments, the processing unit 2002 is configured to: determine signal strength values of a plurality of frequency points that are adjacent to the sampling point; use a frequency point with the largest signal strength value as the frequency point corresponding to the synchronization signal; and determine the starting position of the synchronization signal according to a time-frequency information of the frequency point.

In some embodiments, the receiving node includes a FPGA and a processor. The FPGA is configured to: encapsulate the radio frame data and the local clock; and transmit the encapsulated data to the processor. The processor is configured to preprocess the encapsulated radio frame data to obtain the radio frame data and a local clock when the receiving node receives the radio frame data.

In some embodiments, the radio frame may include at least one candidate time-frequency location periodically distributed, the candidate time-frequency location is used to carry the synchronization signal, and a candidate time-frequency location corresponds to a plurality of consecutive time-domain symbols in a sub-frame and a plurality of consecutive frequency domain units.

In some embodiments, the radio frame is an NR radio frame or an LTE radio frame.

In an implementation by hardware, the acquisition unit 2001 in the embodiments of the present application may be integrated on a communication interface, and the processing unit 2002 may be integrated on a processor. The specific implementation is shown in FIG. 21.

Figure 21:
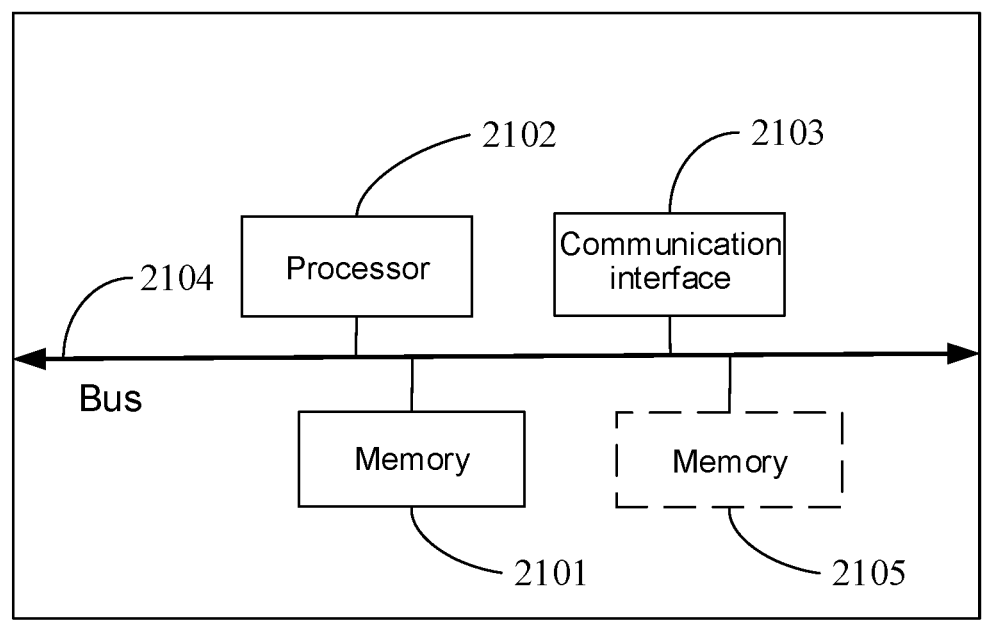
FIG. 21 is a structural diagram of a synchronization apparatus, in accordance with some embodiments.

FIG. 21 shows another possible structural schematic diagram of a synchronization apparatus involved in the above embodiments. The apparatus includes a processor 2102 and a communication interface 2103. The processor 2102 is used to control and manage actions of the device, for example, to perform the steps performed by the processing unit 2002, and/or to perform other processes of the solutions described herein. The communication interface 2103 is used to support communication between the apparatus and other network entities, for example, to perform the steps performed by the acquisition unit 2001. The apparatus may further include a memory 2101 and a bus 2104, and the memory 2101 is used to store program codes and data of the apparatus.

The memory 2101 may be a memory in the apparatus; the memory may include a volatile memory, such as a random access memory; the memory may also include a nonvolatile memory, such as a read-only memory, flash memory, hard disk or solid-state hard disk; the memory may also include a combination of the above-mentioned types of memory.

The processor 2102 may implement or execute various exemplary logic blocks, modules and circuits described in the contents of the present disclosure. The processor may be a central processing unit, a general-purpose processor, a digital signal processor, an application specific integrated circuit, a field programmable gate array or any other programmable logic device, a transistor logic device, a hardware component, or any combination of the above, which may implement or execute the various illustrative logical blocks, modules and circuits described in the contents of the present disclosure. The processor may also be a combination implementing computing functions, for example, a combination including one or more microprocessors, or a combination of DSP and a microprocessor.

The bus 2104 may be an extended industry standard architecture (EISA) bus or the like. The bus 2104 may be divided into an address bus, a data bus, a control bus and so on. For ease of representation, only one thick line is used in FIG. 21, but it does not mean that there is only one bus or one type of bus.

The apparatus in FIG. 21 may also be a chip. The chip includes one or more than two (including two) processors 2102 and a communication interface 2103.

Optionally, the chip further includes a memory 2105, and the memory 2105 may include a read-only memory and a random access memory, and may provide operation instructions and data to the processor 2102. A part of the memory 2105 may further include a non-volatile random access memory (NVRAM).

In some implementations, the memory 2105 stores the following elements: execution modules or data structures, or their subsets, or their extended sets.

In the embodiments of the present application, corresponding operations are executed by calling the operation instructions stored in the memory 2105 (the operation instructions may be stored in an operation system).

Some embodiments of the present disclosure provide a computer-readable storage medium (e.g., a non-transitory computer-readable storage medium), the computer-readable storage medium has stored a computer program instruction, and the computer program instruction, when executed on a computer (e.g., a receiving node), causes the computer to perform the synchronization method as described in any of the above embodiments.

For example, the computer-readable storage medium may include, but is not limited to a magnetic storage device (e.g., a hard disk, a floppy disk or a magnetic tape), an optical disk (e.g., a compact disk (CD), or a digital versatile disk (DVD)), a smart card and a flash memory device (e.g., an erasable programmable read-only memory (EPROM), a card, a stick or a key driver). Various computer-readable storage media described in the present disclosure may represent one or more devices and/or other machine-readable storage media for storing information. The term "machine-readable storage media" may include, but is not limited to, wireless channels and various other media capable of storing, containing and/or carrying instructions and/or data.

Some embodiments of the present disclosure provide a computer program product, for example, the computer program product is stored on a non-transitory computer-readable storage medium. The computer program product includes computer program instructions, and when the computer program instructions are executed on a computer (for example, a receiving node), the computer program instructions cause the computer to perform the synchronization method as described in the above embodiments.

Some embodiments of the present disclosure provide a computer program. When executed on a computer (for example, a receiving node), the computer program causes the computer to perform the synchronization method as described in the above embodiments.

Beneficial effects of the computer-readable storage medium, the computer program product, and the computer program are same as the beneficial effects of the synchronization method as described in the above embodiments, and details will not be repeated here.

In the embodiments provided by the present disclosure, it will be understood that the system, apparatus and method disclosed may be implemented in other ways. For example, the embodiments of the apparatus described above are merely exemplary. For example, the division of the units is only a logical functional division. In actual implementation, there are other division manners, for example, a plurality of units or modules are combined or integrated into another system, or some features may be ignored or not executed. In addition, mutual coupling or direct coupling or communication connection shown or discussed above may be indirect coupling or communication connection, which is electrical, mechanical or in other forms, through some interfaces, devices or other units.

The units described as separate components may or may not be physically separated, and the components shown as units may or may not be physical units, that is, they may be located in one place, or may be distributed in multiple network units. Part or all of the units may be selected according to actual needs to achieve the purpose of the solution of these embodiments.

Additionally, the functional units in the embodiments of the present disclosure may be integrated into a single processing module, or the functional units may exist separately in physical form, or two or more units may be integrated into a single module.

The above are only specific embodiments of the present disclosure, but the scope of protection of the present disclosure is not limited thereto, and any person skilled in the art may conceive of variations or replacements within the technical scope of the present disclosure, which shall fall within the protection scope of the present disclosure. Therefore, the protection scope of the present disclosure should be determined by the protection scope of the claims.

What is claimed is:

1. A synchronization method applied to a receiving node, the method comprising:
   acquiring radio frame data from a sending node, the radio frame data being carried on a radio frame, and the radio frame data including a synchronization signal;
   performing a search of the synchronization signal in the radio frame data on the radio frame to determine location information of the synchronization signal in the radio frame data; the location information of the synchronization signal being used to indicate a time-frequency location of the synchronization signal in the radio frame;
   determining a time calibration parameter of the receiving node according to the location information of the synchronization signal and a frame structure of the radio frame; and
   calibrating a local clock of the receiving node according to the time calibration parameter and the local clock of the receiving node, so that the receiving node is synchronized with the sending node.

2. The method according to claim 1, wherein performing the search of the synchronization signal in the radio frame data on the radio frame to determine the location information of the synchronization signal in the radio frame data includes:
   performing a down-sampling search on the radio frame data to determine a starting location of the synchronization signal in the radio frame; and
   determining the location information of the synchronization signal in the radio frame according to the starting location of the synchronization signal in the radio frame.

3. The method according to claim 2, wherein performing the down-sampling search on the radio frame data to determine the starting location of the synchronization signal in the radio frame includes:
   performing the down-sampling search on the radio frame data according to a preset step size;
   detecting whether radio frame data corresponding to each sampling point includes a signal, different sampling points having different time-frequency locations in the radio frame; and
   determining, if radio frame data corresponding to a sampling point includes a signal and a signal strength value of the signal is greater than a preset threshold, the starting location of the synchronization signal according to a time-frequency location of the sampling point in the radio frame.

4. The method according to claim 3, wherein detecting whether the radio frame data corresponding to each sampling point includes a signal includes:
   determining whether a signal exists in the radio frame data corresponding to each sampling point according to envelope information of the radio frame data of each sampling point.

5. The method according to claim 3, wherein, the method further comprises:
   switching, if radio frame data corresponding to a sampling point include no signal, frequency points;
   detecting whether a signal exists in radio frame data corresponding to a switched frequency point.

6. The method according to claim 3, wherein determining the starting location of the synchronization signal according to the time-frequency position of the sampling point in the radio frame includes:
   determining signal strength values of a plurality of frequency points that are adjacent to the sampling point;
   using a frequency point with a largest signal strength value as a frequency point corresponding to the synchronization signal; and
   determining the starting position of the synchronization signal according to time-frequency information of the frequency point.

7. The method according to claim 1, wherein the receiving node includes a field programmable logic gate array (FPGA) and a processor, the method further comprises:
   encapsulating the radio frame data and the local clock through the FPGA, and transmitting an encapsulated radio frame data to the processor, so that the processor performs preprocessing on the encapsulated radio frame data to obtain radio frame data and a local clock when the receiving node receives the radio frame data.

8. The method according to claim 1, the radio frame includes at least one candidate time-frequency location periodically distributed, the candidate time-frequency location is used to carry the synchronization signal, and a candidate time-frequency location corresponds to a plurality of consecutive time-domain symbols in a sub-frame and a plurality of consecutive frequency domain units.

9. The method according to claim 1, wherein the radio frame is a new radio interface (NR) radio frame or a long term evolution (LTE) radio frame.

10. A synchronization apparatus applied to a receiving node, the apparatus comprising an acquisition unit and a processing unit; wherein
   the acquisition unit is configured to acquire radio frame data from a sending node; wherein the radio frame data is carried on a radio frame, and the radio frame data includes a synchronization signal;
   the processing unit is configured to perform a search of the synchronization signal in the radio frame data on the radio frame to determine location information of the synchronization signal in the radio frame data; wherein the location information of the synchronization signal is used to indicate a time-frequency location of the synchronization signal in the radio frame;
   the processing unit is further configured to determine a time calibration parameter of the receiving node according to the location information of the synchronization signal and a frame structure of the radio frame; and
   the processing unit is further configured to calibrate a local clock of the receiving node according to the time calibration parameter and the local clock of the receiving node, so that the receiving node is synchronized with the sending node.

11. The apparatus according to claim 10, wherein the processing unit is configured to:
   perform a down-sampling search on the radio frame data to determine a starting location of the synchronization signal on the radio frame; and
   determine the location information of the synchronization signal on the radio frame according to the starting location of the synchronization signal on the radio frame.

12. The apparatus according to claim 11, wherein the processing unit is configured to:
   perform the down-sampling search on the radio frame data according to a preset step size, and detect whether radio frame data corresponding to each sampling point includes a signal, different sampling points having different time-frequency locations in the radio frame; and
   determine, if radio frame data corresponding to a sampling point includes a signal and a signal strength value of the signal is greater than a preset threshold, the starting location of the synchronization signal according to a time-frequency location of the sampling point in the radio frame.

13. The apparatus according to claim 12, wherein the processing unit is configured to:
   determine whether a signal exists in the radio frame data corresponding to each sampling point according to envelope information of the radio frame data of each sampling point.

14. The apparatus according to claim 12, wherein the processing unit is further configured to:
   switching, if radio frame data corresponding to a sampling point include no signal, frequency points, and detecting whether a signal exists in radio frame data corresponding to a switched frequency point.

15. The apparatus according to claim 12, wherein the processing unit is configured to:
   determining signal strength values of a plurality of frequency points that are adjacent to the sampling point; using a frequency point with a largest signal strength value as a frequency point corresponding to the synchronization signal; and determining the starting position of the synchronization signal according to time-frequency information of the frequency point.

16. The apparatus according to claim 10, wherein the receiving node includes a FPGA and a processor, wherein
   the FPGA is configured to: encapsulate the radio frame data and the local clock; and transmit an encapsulated data to the processor; and the processor is configured to perform preprocessing on the encapsulated radio frame data to obtain radio frame data and a local clock when the receiving node receives the radio frame data.

17. The apparatus according to claim 10, the radio frame includes at least one candidate time-frequency location periodically distributed, the candidate time-frequency location is used to carry the synchronization signal, and a candidate time-frequency location corresponds to a plurality of consecutive time-domain symbols in a sub-frame and a plurality of consecutive frequency domain units.

18. The apparatus according to claim 10, wherein the radio frame is an NR radio frame or an LTE radio frame.

19. A synchronization apparatus, comprising: a processor and a communication interface; wherein the communication interface is coupled to the processor, and the processor is used to run computer programs or instructions to implement synchronization method according to claim 1.

20. A non-transitory computer-readable storage medium, wherein the computer-readable storage medium has stored instructions, when the instructions are executed by a computer, the computer performs the synchronization method according to claim 1.

\* \* \* \* \*